(12) United States Patent
Conchy et al.

(10) Patent No.: US 8,704,080 B2
(45) Date of Patent: Apr. 22, 2014

(54) BASIC SOLAR MODULE FOR A DEVICE COLLECTING SOLAR RADIATION

(75) Inventors: Frederic Conchy, Arbanats (FR); Dominique Rochier, Biganos (FR)

(73) Assignee: Exosun, Martillac (FR)

( * ) Notice: Subject to any disclaimer, the term of this patent is extended or adjusted under 35 U.S.C. 154(b) by 1027 days.

(21) Appl. No.: 12/092,732

(22) PCT Filed: Nov. 6, 2006

(86) PCT No.: PCT/FR2006/002459
§ 371 (c)(1),
(2), (4) Date: Jul. 9, 2008

(87) PCT Pub. No.: WO2007/051928
PCT Pub. Date: May 10, 2007

(65) Prior Publication Data
US 2009/0133689 A1    May 28, 2009

(30) Foreign Application Priority Data
Nov. 7, 2005 (FR) ...................................... 05 11280

(51) Int. Cl.
*H01L 31/042* (2006.01)

(52) U.S. Cl.
USPC ............ 136/246; 136/244; 136/251; 136/259

(58) Field of Classification Search
USPC .......................................... 136/246, 259, 251
See application file for complete search history.

(56) References Cited

U.S. PATENT DOCUMENTS

| | | | |
|---|---|---|---|
| 3,988,166 A | 10/1976 | Beam | |
| 4,111,184 A * | 9/1978 | Perkins et al. ................. | 126/577 |
| 4,136,671 A | 1/1979 | Whiteford | |
| 4,209,231 A * | 6/1980 | Sayre ............................ | 359/853 |
| 4,345,582 A | 8/1982 | Aharon | |
| 4,585,318 A | 4/1986 | Seifert | |
| 4,696,285 A | 9/1987 | Zwach | |
| 4,820,033 A | 4/1989 | Sick | |
| 4,832,002 A * | 5/1989 | Medina ......................... | 126/577 |
| 4,930,493 A | 6/1990 | Sallis | |
| 6,058,930 A | 5/2000 | Shingleton | |
| 6,231,197 B1 | 5/2001 | Nakamura | |
| 6,691,701 B1 * | 2/2004 | Roth ............................. | 126/685 |
| 2004/0074490 A1 | 4/2004 | Mills et al. | |
| 2005/0034752 A1 * | 2/2005 | Gross et al. ................... | 136/246 |

FOREIGN PATENT DOCUMENTS

| | | | |
|---|---|---|---|
| DE | 27 55 722 A1 | 6/1979 | |
| DE | 33 01 046 C1 | 4/1984 | |
| DE | 199 22 795 A1 | 11/2000 | |
| DE | 101 92 244 B4 | 5/2005 | |
| DE | 10 2004 018 151 A1 | 10/2005 | |
| EP | 0 276 484 A1 | 8/1988 | |
| EP | 1 475 582 A2 | 11/2004 | |
| FR | 2 480 002 | 10/1981 | |
| FR | 2 814 225 | 3/2002 | |
| GB | 2 235 786 A | 3/1991 | |
| JP | 2002-098415 A | 4/2002 | |
| WO | WO 2005/003647 A1 | 1/2005 | |
| WO | WO 2005/098327 A1 | 10/2005 | |

* cited by examiner

*Primary Examiner* — Thanh-Truc Trinh
(74) *Attorney, Agent, or Firm* — Foley & Lardner LLP (57) ABSTRACT

The basic solar module (3) comprises a frame (31) that can be placed directly or indirectly on the ground, means (32) for processing solar radiation that are mounted on the frame, the frame comprising, which being situated between the ground and the frame, a rotating cylindrical rounded surface of which one axis of revolution is a swinging axis about which the frame can swing relative to the ground.

17 Claims, 7 Drawing Sheets

BASIC SOLAR MODULE FOR A DEVICE COLLECTING SOLAR RADIATION

CROSS-REFERENCE TO RELATED APPLICATIONS

This application is a National Stage application of PCT/FR2006/002459, filed Nov. 6, 2006, which claims priority from French application FR 0511280, filed Nov. 7, 2005.

The invention relates an elementary solar module for the processing of solar radiation, which is intended for a device for the recovery of solar radiation, of the fixed-focus, solar concentrator-collector type.

Document U.S. Pat. No. 6,058,930 describes a modular system that includes an arrangement of solar receivers. A torsion bar acts as the main rotation axle for the solar receivers that are located on each side of the said torsion bar. The main rotation axle is oriented along a direction called "north-south", around which the solar receivers are oriented from east to west. By virtue of its design, such a system must support enormous loads, resulting from wind or any other natural phenomena, in order to ensure that it will remain on the ground. Moreover, all the control forces are concentrated on the main rotation axle, which is stressed mostly in torsion. This necessitates a great deal of energy, which therefore reduces the efficiency of such a system. In addition, the resulting high performance required of the mechanical parts employed leads to high production and installation costs.

SUMMARY

An objective of the invention is to reduce the energy necessary for the operation of such a modular system, while also reducing the production and installation costs.

In order to achieve this objective, the invention proposes an elementary solar module that includes a structure adapted to rest directly or indirectly on the ground, processing means of solar radiation mounted on the structure that includes a rounded surface of cylindrical shape located between the ground and the structure, of which one axis of revolution is an axis of oscillation around which the structure is designed to oscillate in relation to the ground.

Thus the rounded surface allows the oscillation of the structure, requiring minimum forces, and therefore minimum energy, in order to make them perform a rotation movement. As a consequence, the mechanical parts no longer need to be of the high performance type, which simplifies them and reduces their production and installation costs.

Advantageously but optionally, the elementary solar module exhibits at least one of the following additional characteristics:
  the axis of oscillation around which the structure is adapted to oscillate passes substantially through a centre of gravity of the elementary solar module,
  since the processing means are mounted to be mobile on the structure through a pivoting link, an axis of rotation of the pivoting link passes substantially through a centre of gravity of the processing means,
  the axis of rotation is substantially orthogonal to the axis of oscillation of the structure,
  the processing means include at least one solar sensor,
  the processing means include at least one surface that reflects the solar radiation, and
  the reflecting surface is concave.

The invention also proposes a device for the recovery of solar radiation that includes at least one focal point adapted to receive the solar radiation, a device to control tracking of the solar motion, at least one elementary solar module with at least one of the aforementioned characteristics and adapted to be controlled by the control device.

Advantageously but optionally, the device will possess at least one of the following additional characteristics:
  the device includes at least two elementary solar modules, at least one first element for linking the structures of two contiguous elementary solar modules, at least one second element for linking the processing means of the two contiguous elementary solar modules,
  the control device is adapted to act on at least one of the first and second linking elements,
  the device includes means that form a base adapted to support the structure of the elementary solar module,
  a strip is located between the means forming the base and the rounded surface of the structure,
  the strip is attached at one end to the means forming the base and at the other end to the structure,
  the strip has a surface profile adapted to be in contact with the rounded surface of the structure and/or the means forming the base, arranged so as to allow the removal of any debris, and
  the strip is flexible in a direction perpendicular to the surfaces that are adapted to be in contact with the rounded surface of the structure and/or the means forming the base, and rigid in the other directions.

BRIEF DESCRIPTION

Other characteristics and advantages of the invention will appear on reading the description that follows, and with reference to the attached figures, in which:

FIGS. 5a to 5c represent the daily tracking pattern of the sun for the assembly of FIG. 2, FIGS. 6a and 6b represent a view in three dimensions of a second embodiment of a set of elementary solar modules according to the invention.

DETAILED DESCRIPTION

Figure 1:
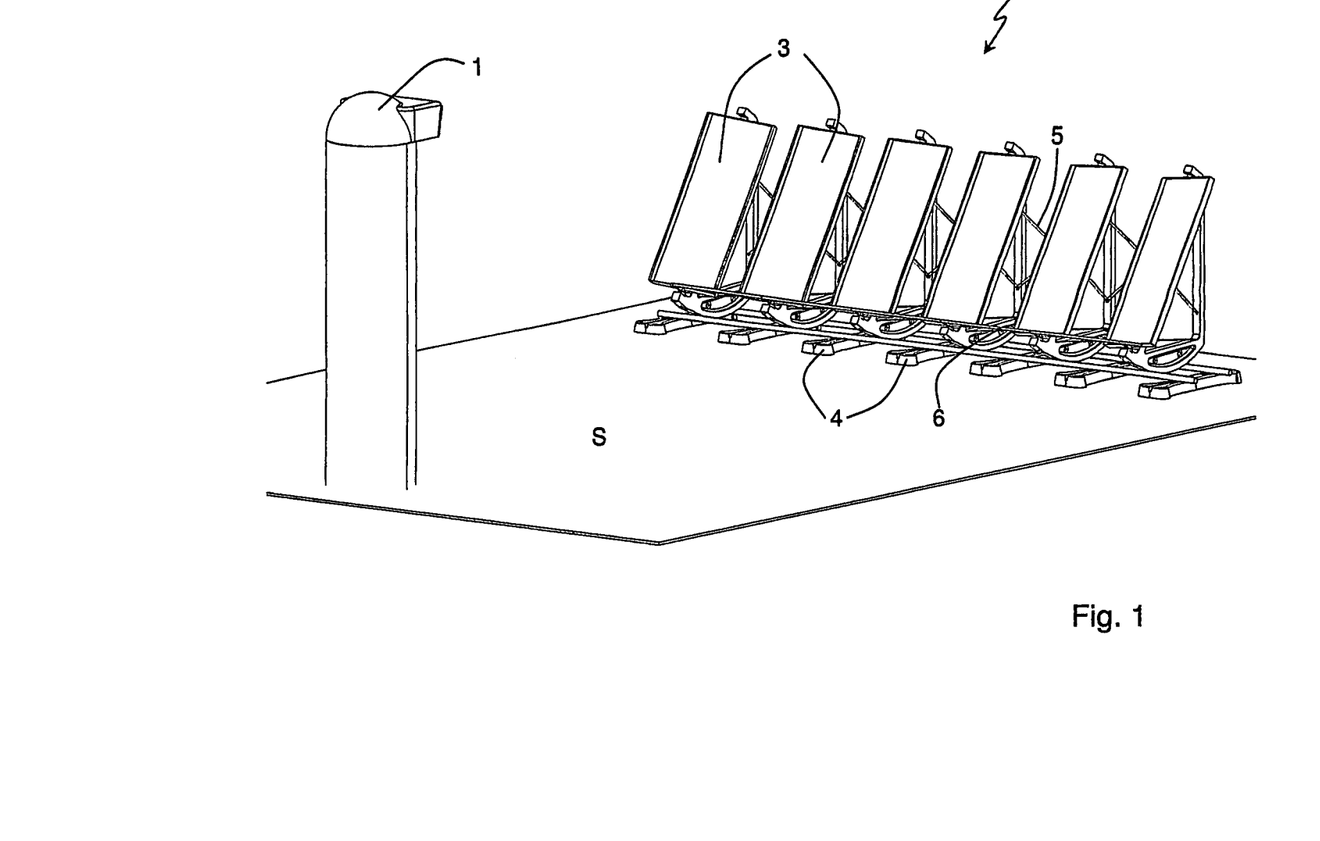
FIG. 1 represents a view in three dimensions of a device for the recovery of solar radiation according to the invention.

Referring to FIG. 1, a device for the recovery of solar radiation of the fixed-focus solar concentrator-collector type includes a fixed target or a fixed focal point 1, which here is located at the top of a post. This fixed focal point is adapted to receive solar radiation that has been concentrated by an assembly 2 formed from elementary solar modules 3 that, in the case illustrated here, reflect the solar radiation toward the fixed focal point 1. The different elementary solar modules here rest on bases 4. Moreover, the device for the recovery of solar radiation includes a control device (not shown) which can be used to effect solar tracking, as will be described later. The assembly of the device for the recovery of solar radiation is generally mounted in a position that is sunlit from sunrise to sunset on an area of ground or a surface S.

Figure 2:
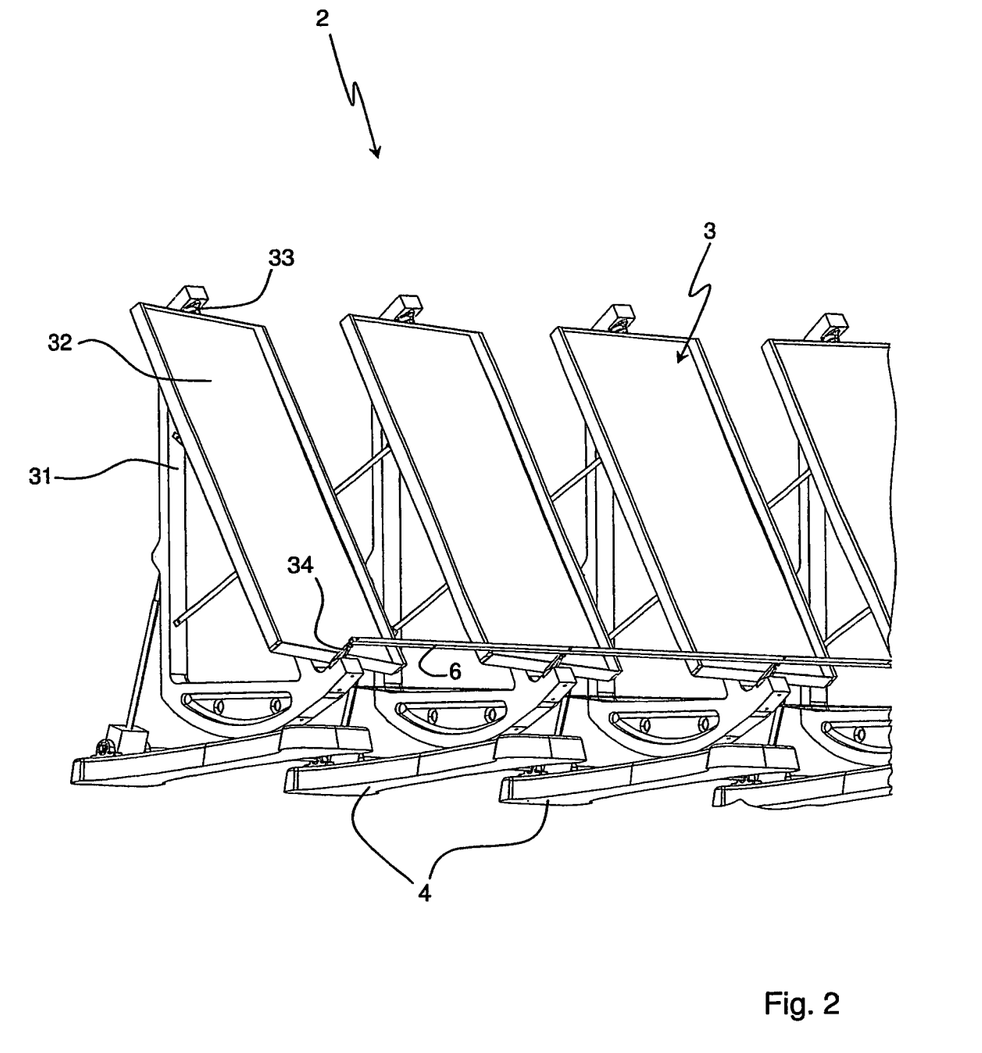
FIG. 2 represents a view in three dimensions, from the front, of a set of elementary solar modules according to the invention.
Figure 3:
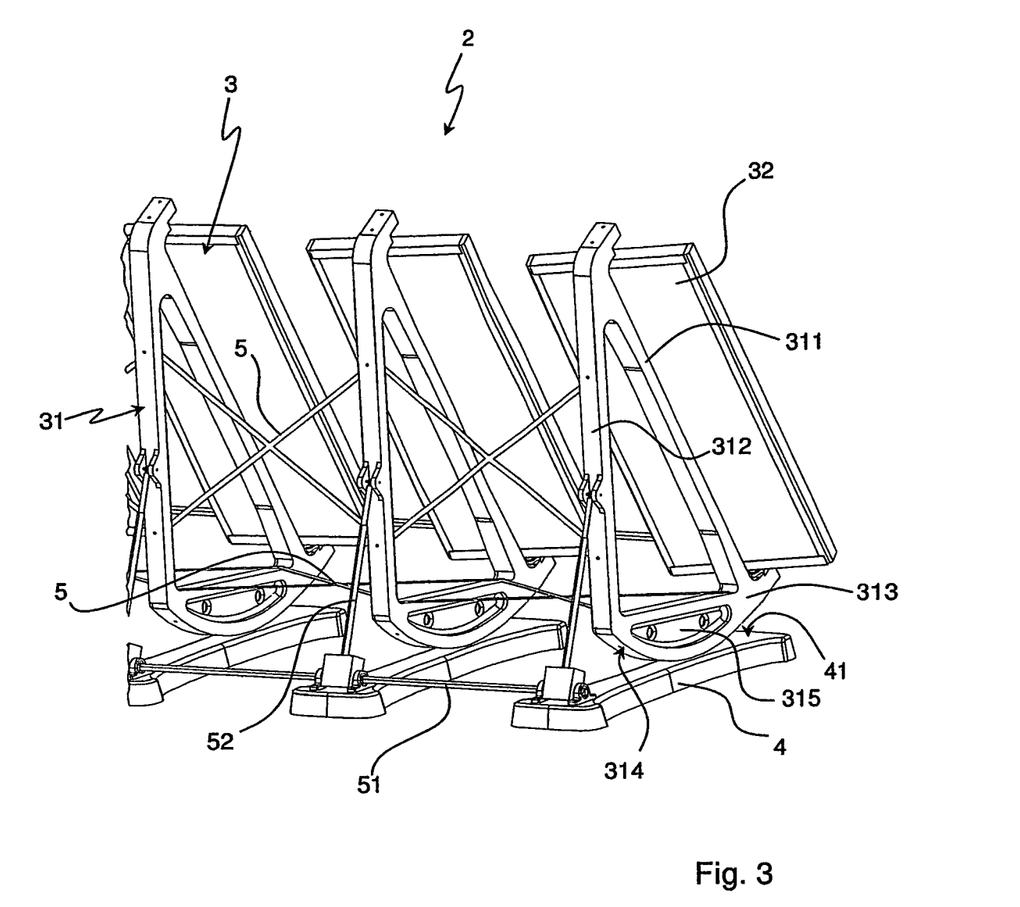
FIG. 3 represents a view in three dimensions, from the rear, of the assembly of FIG. 2.
Figures 4A, 4B:
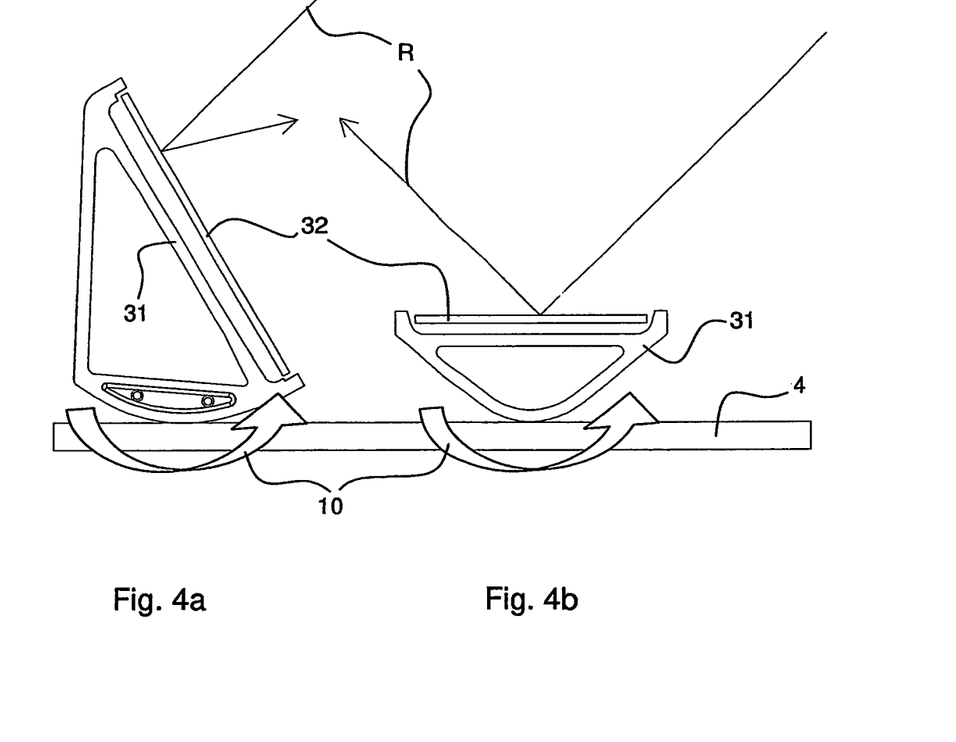
FIG. 4a represents a side view of an elementary solar module of the assembly of FIG. 2.
FIG. 4b represents a side view of one embodiment variant of the elementary solar module.

With reference to FIGS. 2, 3 and 4*a*, we will now describe in detail an elementary solar module 3 according to the invention. An elementary solar module includes a structure 31 here placed indirectly on the ground by means of a base 4. The elementary solar module 3 includes processing means 32 of the solar radiation R, which are mounted to be mobile in rotation on the structure 31 by means of a pivoting link 33. The processing means 32 have a centre of gravity that is located substantially on the axis of rotation of the pivoting link 33. Thus, the processing means 32 are balanced optimally in relation to the axis of rotation. Here, the processing means 32 consist of a reflecting frame that includes a surface adapted to reflect solar radiation. This surface may be substantially flat or may be concave, with a centre of curvature that is located substantially in the vicinity of the fixed focal point 1, once the device for the recovery of solar radiation has been constructed. In a variant, the processing means may include solar sensors (photovoltaic cells, thermal sensors, etc.).

The elementary solar module includes means for putting the processing means 32 into rotation 34. Here, the means for putting into rotation 34 include a lever in the form of a bar attached rigidly to the reflector frame at one of the its ends and attached at the other end to a linking device 6.

Here the structure 31 is of generally right-angled triangular shape, with two adjacent sides 312, 313 and one side 311 forming the hypotenuse. The processing means 32 extend parallel to side 311, and are connected to the structure at the ends of sides 312 and 313. Side 313 has a rounded surface 314 of cylindrical revolution shape that is adapted to make contact with a substantially flat surface 41 of the associated base 4 in order to allow the structure to oscillate. This surface 314 is surmounted by an additional mass 315. The role of this mass 315 is to create a centre of gravity of the elementary solar module that is substantially on an axis of revolution of the rounded surface 314. Like for the processing means, this allows us to optimally balance the module in an oscillating movement 10 around this axis of revolution, which is then the axis of oscillation of the module.

The structure 31 includes means for putting into oscillation 52. Here the latter are composed of a connecting rod 52 of which one free end is linked to a side 312 of the structure. The other end of the connecting rod 52 is connected to a control device 51 which is linked to the aforementioned control device. The movement of the oscillating structure in relation to ground will allow seasonal tracking of the sun.

FIG. 4*b* illustrates an embodiment variant of the structure 31. It differs from the preceding embodiment by the positioning of the rounded surface 314, which here is effected at the coupling of the adjacent sides of the structure. This can be used to adapt the device for the recovery of solar radiation to suit the desired reflection effect and the geographical location of the place where it has been erected.

The assembly 2 of the device for the recovery of solar radiation is created by assembling two or more elementary solar modules 3. Two contiguous elementary solar modules are first connected together at their respective structures 31, and in addition at their respective processing means 32. At the structures 31, linking elements 5, here in the form of cross members, rigidly bind together the respective adjacent sides 312, 313 of the two adjacent elementary solar modules. These cruciform elements are used to attach the elementary solar modules, thereby stiffening the assembly 2.

At the processing means 32, a linking element 6, here in the form of a bar, connects the ends of the levers 34. The linking element 6 may be connected to the control device of the aforementioned tracking arrangement. The processing means rotating in relation to structure allow daily tracking of the Sun.

Figures 5A, 5B, 5C:
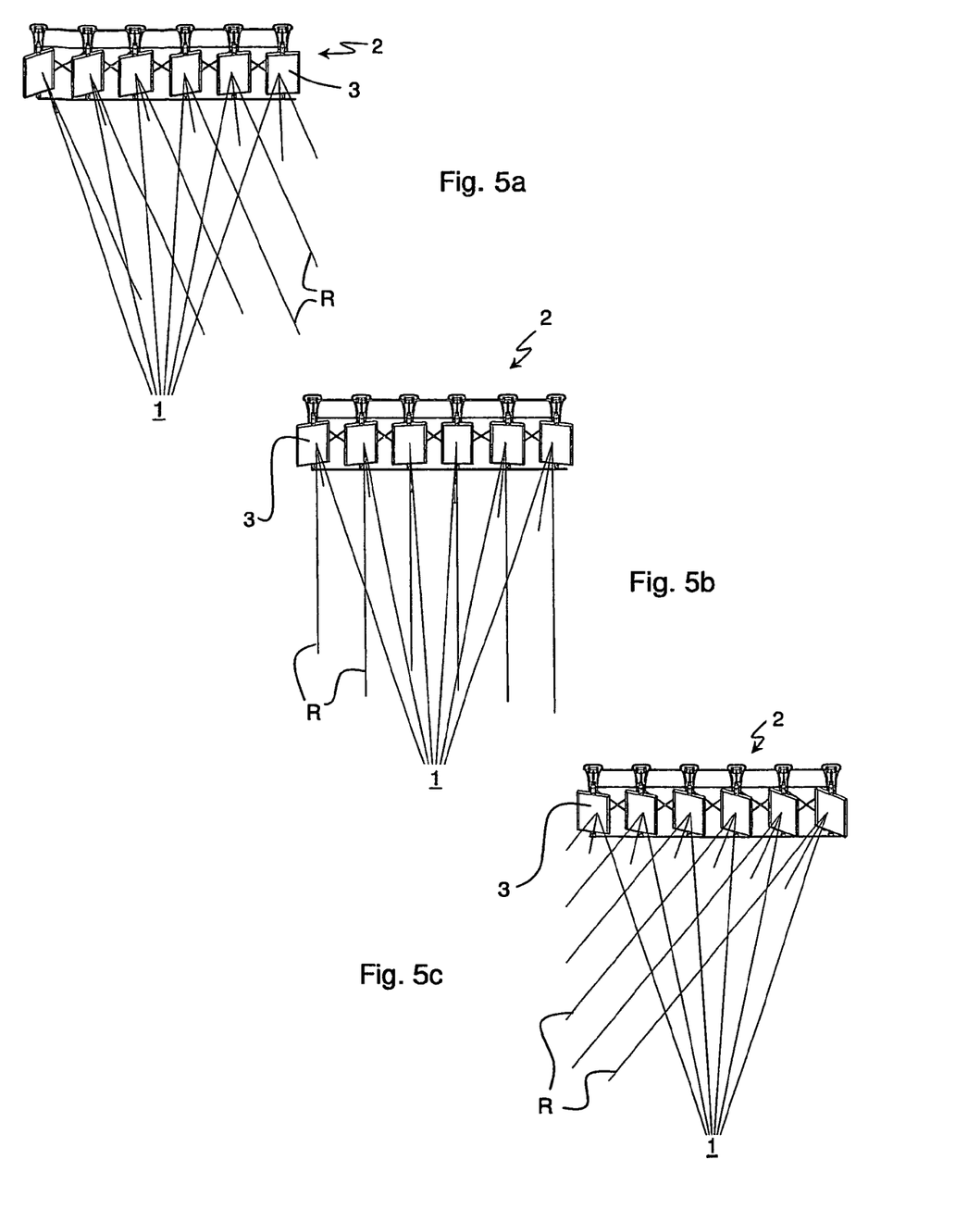

With reference in FIGS. 5*a* to 5*c*, we will now describe the operation of the device for the recovery of solar radiation according to the invention. FIG. 5*a* is the state of the device in the morning, FIG. 5*b*, at midday and FIG. 5*c* in the evening. It is recognised that daily solar tracking significantly increases the efficiency and output of the solar sensors. It allows direct orientation of the normal of the sensor toward the sun, and increases the production of electrical or thermal energy by about a third. Moreover, the modular design and the seasonal tracking of the sun through the oscillating movement of a structure render the combination of the two movements capable of focussing radiation from two directions at a single point.

Initially, at the time of its erection on the site, each reflector frame is pre-oriented to reflect the solar radiation R toward the fixed focal point 1. This adjustment corresponds to the orientation of a normal to the reflecting surface to coincide with a bisecting line between the position of the sun at a given moment and the target that forms the fixed focal point.

In operation, when the sun changes position, all of the reflector frames are adapted to rotate by half of the relative solar movement in order to direct the reflected rays toward the target. The correction angle is therefore identical for all the reflectors, thus allowing the use of a single solar tracking control associated with the tracking control device. In order to achieve this single control, the oscillating structures are aligned and maintained at equal distance by the cruciform linking elements 5. This alignment allows the installation of a control connecting rod 51, 52 and 6 that drives all of the mirrors in an identical manner, with the connecting rod connected to the solar tracking control device.

The single control for a large number of modules is rendered possible through the use of a particular design, as described above. For seasonal tracking, the design of the oscillating structure allows us to minimise the control forces by placing the centre of gravity of the assembly substantially at the oscillation axis of the oscillating structure. Likewise, for daily tracking, the design of the reflector frame allows us to minimise the control forces by placing the centre of gravity of the reflector frame substantially at the axis of rotation of the reflector frame in relation to the oscillating structure. This particular design allows us to have a very low energy requirement for the control of the assembly formed from the reflectors. This in turn allows us to improve solar focussing by reducing the energy requirement for controlling the structure tracking the sun.

The modular structure of the device for the recovery of solar radiation according to the invention results in:
- a concentration factor that is variable according to the application, this factor being connected to the number of elementary solar modules oriented onto a receive target, with the concentration of the frame mobile reflector frame ranging from 1 to 30, for example,
- receiving surfaces that are variable depending on the number of elementary modules (from 10 to 1000 $m^2$, for example),
- the ability to adjust the number of fixed focal points, with the ability to point to different focal points according to the need of the moment, with this flexibility linked to the fixed focal point, due to the dissociation of the concentrator and the focal point,
- the ability to propose different elementary receiving reflector surfaces (per modules) (from 1 to 5 $m^2$, for example)

It is thus possible to envisage a variety of solutions for arranging and configuring the installation, through the variable distance between the fixed focal point and the elementary solar modules, and diversity in the use of the focal point (thermal, electrical, light or mixed).

This results in a reduction in production costs through simplification of the hardware, namely the number of parts necessary in greater quantity and less complex.

For large dimensions, it is possible make use of several strips of elementary solar modules, either on a level on sloping terrain, or behind each other while keeping the necessary separation to avoid shadows from the preceding row of modules.

Other types of arrangement can be envisaged according to the various conditions involving geography, climate, sloping ground, etc.

The new energy requirements (thermal, electrical) all over the world call more for small units that are easier to be installed, managed and maintained by the local population than large stations that redistribute through networks that require major infrastructures.

It should be noted that less interference on a reflector frame results in less disruption of the rest of the device for the recovery of solar radiation according to the invention.

Moreover, the latter is of human height, thereby facilitating transportation, installation, maintenance, cleaning, protection from bad weather, and reduction of the effect of wind, thereby generating lower assembly costs and improving integration into any environment, whether urban or not.

Figure 6A:
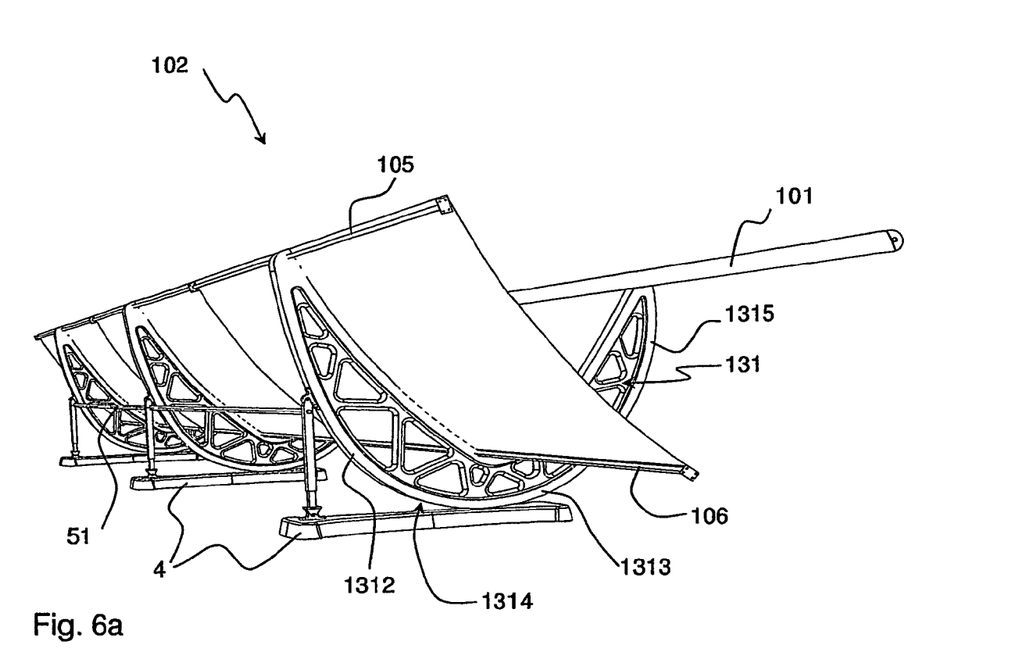
Figure 6B:
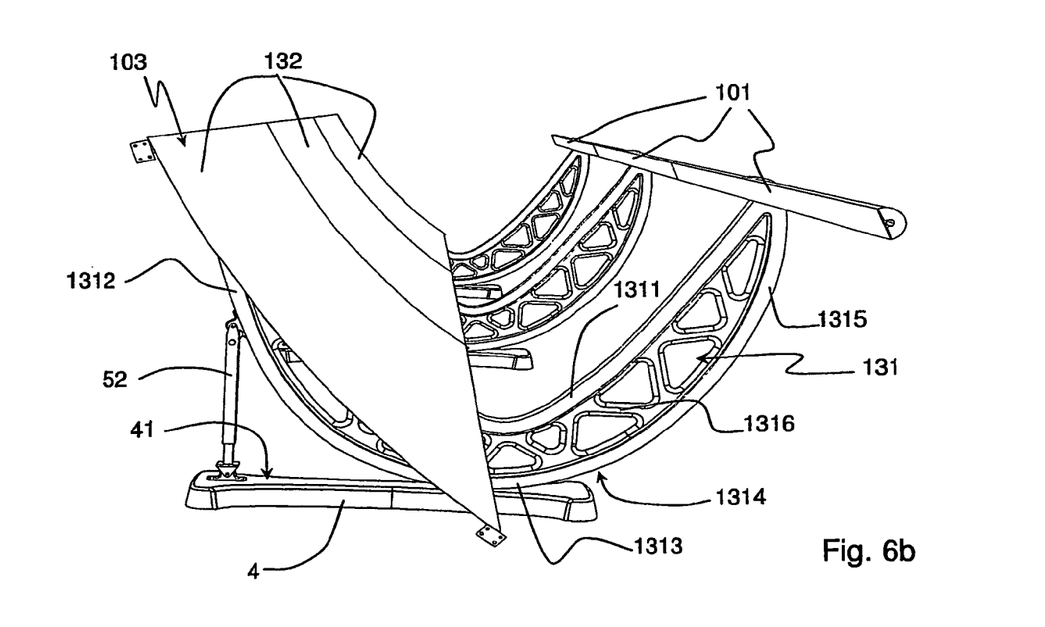

With reference in FIGS. 6a and 6b, we will now describe a second embodiment of a set of elementary solar modules according to the invention. The elements that are common with the first embodiment, previously described, are indicated in the figures with the same reference numbers. Here, assembly 102 is formed by three elementary solar modules 103. In this embodiment of the invention, each elementary solar module 103 includes its own focal point 101 that may comprise photocells for example.

In addition to the base 4 which is adapted to be placed on the ground and to distribute the forces, the elementary solar module 103 includes:

a structure 131 resting on the base 4 and adapted to roll on the latter during an oscillating movement, in a manner similar to the structure 31 of the preceding embodiment, means forming a reflector 132, here firmly attached to the structure 131, a control system 51, 52 for seasonal tracking, and, a focal point 101, here firmly attached to the structure 131.

In this case, the structure 131 is of generally crescent shape and includes, on the outside, three consecutive incurving parts 1312, 1313, 1315. In particular, part 1313 is of circular shape and includes a rounded surface of revolution 1314 that is adapted to make contact with the substantially flat surface 41 of the associated base 4 in order to allow the structure to oscillate. On the inside, the structure 131 includes a concave, inward-curving part 1311. The ends of incurving part 1311 are attached respectively to incurving part 1312 and incurving part 1315, forming the ends of the crescent shape of the structure 131, and are therefore facing each other. Mounted on one side of the incurving part 1311 is a device forming a reflector 103, here by means of bars 105 and 106. Mounted on the other side of the incurving part 1311, at the associated end, is a focal point 101, with the latter then facing the device forming the reflector 103.

Between firstly the incurving part 1311, and secondly the three consecutive incurving parts 1312, 1313, 1315, there is an additional mass 1316. The role of this mass 1316 is to:

stiffen the structure 131, provide a centre of gravity for the elementary solar module 103 that is substantially on an axis of revolution of the rounded surface 1314. This allows us to optimally balance the module in an oscillating movement around this axis of revolution, which then becomes the oscillation axis of the module.

It should be noted that bars 105 and 106 are interconnectable from one module to the next in order to connect the elementary solar modules together.

The shape of the means forming the reflector is such that the associated focal point 101, for its part, receives concentrated solar radiation. This arrangement of the focal point in relation to the means forming the reflector is free of any obstacle, in order to eliminate any shadows. The light density of the solar concentration at the focal point is therefore as regular as possible, which makes it possible to use photocells at the focal point for example. In fact, a set of interconnected photocells cannot work in an optimal manner if the light density is not regular. The focal point may be used in several ways, such as:

with photocells of moderate efficiency and output deposited on glass and cooled by a heat-bearing liquid in order to achieve cogeneration, with photocells of high efficiency and output, cooled by a heat-bearing liquid, used to achieve cogeneration where appropriate. This solution favours electrical production, on a thermal exchanger of the hot-air type, used to power an "Ericsson" type motor for example.

The opening of the angle of illumination of the focal point in relation to the means forming the reflector remains less than 90°, which allows us to ensure optimum efficiency and output of the photocells by limiting the fraction reflected by the photocell.

Like for the embodiment of the invention previously described, the assembly 102 of elementary modules remains at a reasonable height, which may be less than 2 m in relation to the installation surface (ground, roof, etc.), thus facilitating its incorporation into an urban landscape. The elementary solar modules, preferably of small size, thus facilitate transportation, installation, maintenance and cleaning.

For assemblies of large dimension, it is possible to employ several strips of concentrator, on a level on sloping terrain or behind each other, for example, while ensuring adequate separation to eliminate shadows from the row of modules in front.

Other types of arrangement may be envisaged to suit the different conditions arising from geography, climate, ground slope, etc.

Figure 7A:
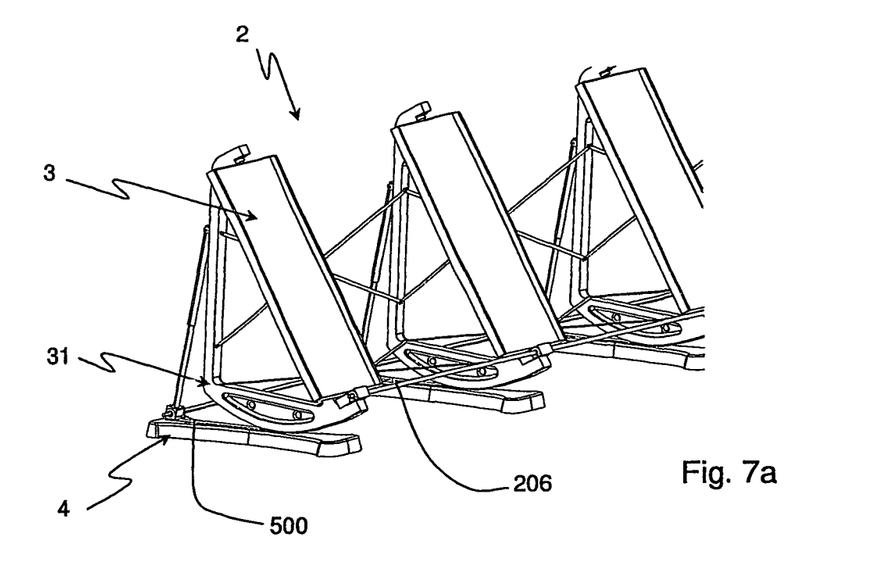
FIGS. 7a and 7b represent a view in three dimensions of one embodiment variant of all the elementary solar modules of FIG. 2.
Figure 7B:
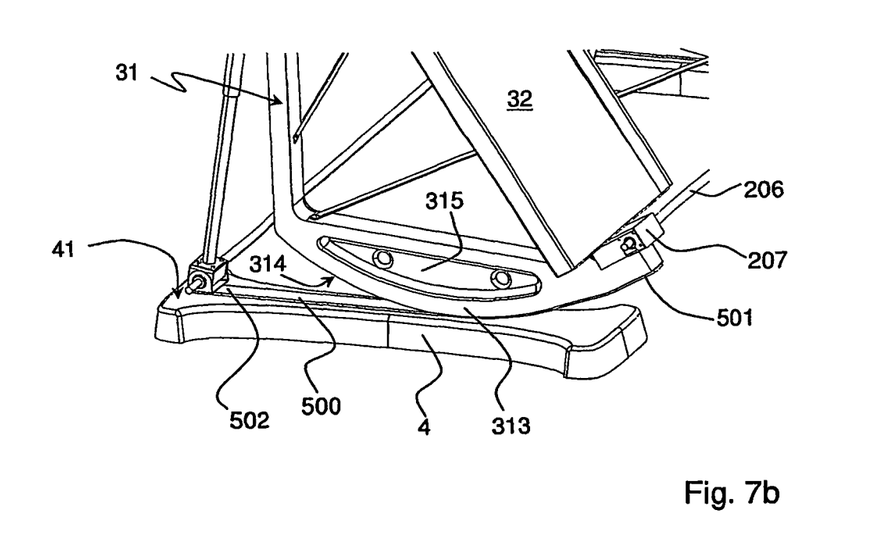

With reference in FIGS. 7a and 7b, we will now describe a variant of embodiment of the first embodiment of FIGS. 2 and 3, described previously.

In this variant, the linking element 6 and the levers 34 (see FIG. 2) are replaced by a bar 206 forming a shaft, and an instrument 207 for transmitting the movement of the bar 206 to the processing resources 32. For example, the instrument 206 may include an endless screw linked to the bar 206 meshing with a gear arrangement connected to the processing resources.

A semi-rigid strip 500 connects the base 4 to the structure 31, fitting in between the surface 41 of the base and the rounded surface 314 of the structure. The semi-rigid strip 500 is linked at one end 501 to the structure and at the other end 502 to the base. When the structure changes position during an oscillating movement, it rolls in relation to the base, winding onto or off the semi-rigid strip 500 according to its direction of oscillation. This strip is of general rectangular section and has a profile at the surfaces adapted make contact respectively with the surface 41 of the base and the rounded surface 314 of the structure, allowing the removal or elimination of any debris that may have collected. The strip 500 is said to be semi-rigid since, given its shape, it is able to bend in the direction of its length that is used when the structure rolls upon it, and when the strip rolls and unrolls during an oscillating movement of the structure. On the other hand, it exhibits a rigidity that has a preventive effect on any other type of relative movement between the structure and the base. This semi-rigid strip allows movement without slippage between the structure and the base. The absence of slippage guarantees parallel operation of the various structures of an assembly 2 during the solar tracking movements. Moreover, this semi-rigid strip 500 allows effortless control during seasonal tracking movements of the structure that, which thus oscillates so that it presents a point of contact with the ground that is always vertically above the motion of the centre of gravity.

It should be noted that this semi-rigid strip may be included in a similar manner in the elementary solar module 103 of FIGS. 6*a* and 6*b*.

From the materials viewpoint, the largest part of the structure is in concrete (structure 31, base 4) poured into a mould, and it may be manufactured on site, to a human scale, since the modular aspect of the structure necessitates only concrete parts of modest size, with no special requirement for lifting gear. The device for the recovery of solar radiation according to the invention is therefore suitable for isolated sites and villages in developing countries.

The use of a composite concrete provides a better compromise in terms of costs (simplicity, reproducibility, etc.), stability (a mass that makes it insensitive to wind) and ageing.

In order to overcome a certain fragility in traction, the concrete parts are reinforced with a metal core of the twisted wire type and the incorporation of short fibres buried in the mass, which slows down the development of any cracks.

This solution in terms of materials allows us to achieve, at moderate cost, parts of large section which rapidly afford stiffness to the assembly, thereby shifting any resonances connected with the action of the wind, in order that the latter cannot adversely affect the assembly. Concrete also provides considerable mass, which stabilises the assembly in relation to external forces and ensures more stable positioning in relation to the Sun.

The apparent incompatibility of having heavy parts in movement is therefore solved by means of two parameters, in that the cinematic described above allows us to get over the weight of the parts by moderating the control forces by virtue of a centre of gravity that is always vertically above the point of contact and positioned substantially on the oscillation axis. Finally, since the tracking speeds are very low (180° in 10 h for the daily tracking and 40° in 6 months for the seasonal tracking), no dynamic phenomena interfere with the ability to move large masses.

The composition of the concrete includes sand, gravel and/or expanded clay, cement, short fibres and twisted wire reinforcement. The composition of the concrete provides a choice between gravel and clay, which is determined according to the need to moderate the weight of the parts to be made in order to facilitate handling or transportation.

Naturally, the present invention is in no way limited to the example described and represented, the latter being provided only by way of illustration.

The invention claimed is:

1. An elementary solar module, comprising:
    a structure adapted to rest directly or indirectly on the ground, and
    processing means for solar radiation mounted on the structure,
    wherein the structure comprises a rounded rolling surface of cylindrical revolution shape located between the ground and the structure,
    wherein one axis of revolution of the rounded rolling surface is an oscillation axis of the structure around which the structure is adapted to oscillate and to roll on the rolling surface in relation to the ground,
    wherein the structure is of generally upright right-angled triangular shape such that the rounded rolling surface is on the lower side of the generally upright right-angled triangular shape, and the rounded rolling surface comprises a first end and a second end such that the first and second ends are separated by a non-zero distance along a longitudinal direction of the rounded rolling surface.

2. The elementary solar module according to claim 1, wherein the oscillation axis passes substantially through a center of gravity of the elementary solar module.

3. The elementary solar module according to claim 1, wherein the processing means is mounted to be mobile on the structure through a pivoting link, and wherein an axis of rotation of the pivoting link passes substantially through a center of gravity of the processing means.

4. The elementary solar module according to claim 3, wherein the axis of rotation of the pivoting link is substantially orthogonal to the oscillation axis of the structure.

5. The elementary solar module according to claim 1, wherein the processing means comprises at least one solar sensor.

6. The elementary solar module according to claim 1, wherein the processing means comprises at least one reflecting surface for reflecting the solar radiation.

7. The elementary solar module according to claim 6, wherein the reflecting surface is concave.

8. A device for recovery of solar radiation, comprising:
    at least one focal point adapted to receive the solar radiation;
    a control device configured to control tracking of solar motion; and
    at least one elementary solar module according to claim 1, adapted to be controlled by the control device.

9. The device according to claim 8, further comprising:
    another elementary solar module,
    at least one first element for linking the one and another elementary solar modules, and
    at least one second element linking the processing means of the one and another elementary solar modules.

10. The device according to claim 9, wherein the control device is adapted to act on at least one of the first and second linking elements.

11. The device according to claim 8, wherein the device includes a base adapted to support the elementary solar module.

12. The device according to claim 11, wherein a strip is located between the base and the rounded rolling surface of the structure.

13. The device according to claim 12, wherein the strip is attached at one end to the base and at the other end to the structure.

14. The device according to claim 12, wherein the strip has a surface profile adapted to be in contact with the rounded rolling surface of the structure and/or the base, and arranged to allow removal of any debris.

15. The device according claim 12, wherein the strip is flexible in a direction perpendicular to surfaces adapted to be in contact with the rounded rolling surface of the structure and/or the base, and is rigid in other directions.

16. The elementary solar module according to claim 1, wherein the structure is adapted to limit oscillation and rolling on the rolling surface between the first and second ends of the rounded rolling surface.

17. An elementary solar module, comprising:
- a structure adapted to rest directly or indirectly on the ground, and
- a reflecting frame that includes a surface adapted to reflect solar radiation, the reflecting frame being mounted on the structure,
- wherein the structure comprises a rounded rolling surface of cylindrical revolution shape located between the ground and the structure,
- wherein one axis of revolution of the rounded rolling surface is an oscillation axis of the structure around which the structure is adapted to oscillate and to roll on the rolling surface in relation to the ground,
- wherein the structure is of generally upright right-angled triangular shape such that the rounded rolling surface is on the lower side of the generally upright right-angled triangular shape, and the rounded rolling surface comprises a first end and a second end such that the first and second ends are separated by a non-zero distance along a longitudinal direction of the rounded rolling surface.

* * * * *